United States Patent [19]

Maldague

[11] Patent Number: 4,860,547
[45] Date of Patent: Aug. 29, 1989

[54] PROCESS AND APPARATUS FOR EXTRACTING LIQUIDS FROM AGGREGATES AND FROM GAS/VAPOR MIXTURES

[75] Inventor: Pierre Maldague, Brussels, Belgium

[73] Assignee: S.A. Separgaz, Luxembourg

[21] Appl. No.: 930,149

[22] Filed: Nov. 12, 1986

[30] Foreign Application Priority Data

Nov. 12, 1985 [LU] Luxembourg .................... 86156

[51] Int. Cl.$^4$ ........................................... F25B 9/00
[52] U.S. Cl. ........................................ 62/86; 34/79;
55/15; 62/402
[58] Field of Search ................. 62/86, 401, 402, 67, 62/85, 317, 318; 55/15; 34/77, 78, 79

[56] References Cited

U.S. PATENT DOCUMENTS

| | | | |
|---|---|---|---|
| 2,399,394 | 4/1946 | Seippel | 60/39.45 |
| 2,453,923 | 11/1948 | Mayo | 62/402 |
| 2,461,186 | 2/1949 | Seippel | 60/41 |
| 2,569,909 | 10/1951 | Umney | 183/80 |
| 2,716,289 | 8/1955 | Lauck | 34/77 |
| 2,832,665 | 4/1958 | Hertzberg et al. | 423/405 |
| 2,832,666 | 4/1958 | Hertzberg et al. | 423/407 |
| 2,857,979 | 10/1958 | Van Dijick | 55/431 |
| 2,902,337 | 9/1959 | Hertzberg et al. | 23/1 |
| 3,026,966 | 3/1962 | Asklof | 55/15 |
| 3,109,721 | 11/1963 | Zenner et al. | 55/15 |
| 3,226,948 | 1/1966 | Aldesson et al. | 62/402 |
| 3,230,923 | 1/1966 | Hughes | 55/15 |
| 3,258,895 | 7/1966 | Wiebe et al. | 55/457 |
| 3,384,117 | 5/1968 | Hansel | 137/624.13 |
| 3,528,217 | 9/1970 | Garrett | 55/15 |
| 3,616,616 | 11/1971 | Flatt | 55/306 |
| 3,771,286 | 11/1973 | Scott | 55/15 |
| 3,839,846 | 10/1974 | Teller | 55/15 |
| 3,854,300 | 12/1974 | Gerhold | 62/402 |
| 3,977,850 | 8/1976 | Hill | 55/419 |
| 3,998,711 | 12/1976 | Hertzberg et al. | 204/157.15 |
| 4,021,215 | 5/1977 | Rosenbush et al. | 62/402 |
| 4,134,216 | 1/1979 | Stevens | 34/77 |
| 4,198,359 | 4/1980 | Todd | 261/77 |
| 4,447,965 | 5/1984 | Bray | 34/77 X |
| 4,504,285 | 3/1985 | Modisette | 55/16 |

FOREIGN PATENT DOCUMENTS

| | | |
|---|---|---|
| 514256 | 10/1952 | Belgium . |
| 898745 | 4/1984 | Belgium . |
| 0162509A1 | 4/1985 | European Pat. Off. . |
| 485386 | 10/1929 | Fed. Rep. of Germany . |
| 2301467 | 1/1973 | Fed. Rep. of Germany . |
| 1230416 | 9/1960 | France . |
| 2444882 | 7/1980 | France . |
| 2535445 | 5/1984 | France . |
| 85336 | 4/1984 | Luxembourg . |
| 85708 | 12/1984 | Luxembourg . |
| 2818 | of 1906 | United Kingdom . |
| 8273 | of 1906 | United Kingdom . |
| 290669 | 6/1928 | United Kingdom . |
| 553208 | 11/1941 | United Kingdom . |
| 843912 | 6/1956 | United Kingdom . |
| 859607 | 1/1961 | United Kingdom . |
| 1283587 | 7/1972 | United Kingdom . |

OTHER PUBLICATIONS

Rose, P. H., "Potential Applications of Wave Machinery to Energy and Chemical Processes", from Proceed-

(List continued on next page.)

Primary Examiner—Ronald C. Capossela
Attorney, Agent, or Firm—Pollock, Vande Sande & Priddy

[57] ABSTRACT

A process and an apparatus is presented for at least partially extracting a liquid from an aggregate, by evaporation in a stream of carrier gas, followed by separation of at least a portion of the evaporated liquid from the stream of carrier gas. The separation comprises expanding the higher moisture contents stream to a lower pressure so as to effect cooling and resulting liquid condensate from the gas stream, recompressing the cold stream with retained latent heat of vaporization thereby further heating the stream, and discharging the resulting heated stream with the lowered moisture content at an appropriate section of the circuit. In accordance with the present invention, the expansion and the compression take place in a wave pressure exchanger.

27 Claims, 2 Drawing Sheets

OTHER PUBLICATIONS ings of the 12th Int'l. Symposium on Shock Tubes and Waves, Jerusalem, 1980, pp. 3–30.

Stephan K., "An Investigation of Energy Separation in a Vortex Tube", pp. 343–348.

Taussig, R. et al., Defense Advanced Research Projects Agency (DOD), "Investigation of Wave Rotor Transfers for Cruise Missile Engines, Final Report", Apr. 1983, cover and pp. 2-2 & 2-3.

Rapport de Recherche, BE 8700507, 12-01-1988, 2 pages.

Hermitte, J. L. et al., "Cycle de Brayton et pompes a Chaleur Developpement d'un Systeme de Sechage", (Brayton Cycle and Heat Pumps Development of a Drying System), E.D.F. Bulletin de la Direction Des Etudes Et Recherches—Series A, Nucleaire, Hydraulique, Thermique, No. 1, 1981, pp. 17–20.

Moses, C. A. et al., "On the Growth of Steam Droplets Formed in a Laval Nozzle Using Both Static Pressure and Light Scattering Measurements", Journal of Fluids and Engineering, Sep. 1978, vol. 100, pp. 311–322.

Pearson, R. D., "Pressure Exchangers and Pressure Exchange Engines", Chapter 16, vol. II of Benson, R. W. publication, pp. 902–943.

Benson, R. W., "More Complex Homentropic Graphical Calculations", The Thermodynamics and Gas Dynamics of Internal-Combustion Engines, vol. I, pp. 238–245.

Dobbins, R. A., "A Theory of the Wilson Line for Steam at Low Pressures", Journal of Fluids Engineering, vol. 105, Dec. 1983, pp. 414–422.

Gyarmathy, G., "Theorie de la Condensation En Cours De Detente Dans Les Turbines a Vapeur", Revue Francaise de Mecanique, No. 57, 1976, pp. 35–48.

PROCESS AND APPARATUS FOR EXTRACTING LIQUIDS FROM AGGREGATES AND FROM GAS/VAPOR MIXTURES

BACKGROUND OF THE INVENTION

The present invention relates to a process and an apparatus for at least partially extracting, in an open or closed circuit, a liquid from an aggregate, by evaporation in a stream of carrier gas, followed by separation of at least part of said evaporated liquid from said stream of carrier gas, in which the source of energy substantially providing the separation work is the pressure increase of the carrier gas provided by mechanical means driving the carrier gas against all head losses throughout the complete circuit. This separation work comprises expanding the high moisture contents stream to a lower pressure so as to effect cooling and resulting liquid condensation, separating resulting liquid condensate from the gas stream, recompressing the cold stream with retained latent heat of vaporization thereby further heating said stream, and discharging the resulting heated stream with the lowered moisture content at an appropriate section of the circuit. More specifically, the present invention relates to a method of putting to work the driving energy which provides the separative work, and of carrying out said separation.

In this specification, the word "evaporation" has a very broad meaning which includes the production of vapor within a carrier gas by any mechanism, for example a chemical reaction such as combustion. Similarly, the word "aggregate" has a very broad meaning which includes not only materials soaked with a liquid, such as wet wool, or wet or liquid materials to be dried such as wood, milk, etc., but also materials reacting with gas, i.e., by combustion, thus forming a vapor which is a constituent of said reaction gas mixture. The aggregate may thus be, for example, methanization gas, natural gas, burnable waste products, fuel oil, coal, peat, brown coal or burning in air. It may also be, for example, living materials such as plants growing in a greenhouse, or machinery from which seeping liquids are leaking under liquid or vapor form.

The terms "exergy" and "exergetic", relate to that fraction of heat which is convertible in a reversible way into mechanical work, as opposed to "anergy" and "anergetic" which relate to that fraction of heat which is not convertible into mechanical work. The calorific energy of substance is the sum of its exergy and its anergy. By extension, the word exergy used herein also may mean mechanical work or any other energy which is convertible into mechanical work without being subject to the limitation imposed by Carnot's principle.

The expression "acoustic condensation" relates to the process of transient additional condensation of vapor which occurs within the flow of a gas/vapor mixture undergoing an adiabatic quasi-isentropic expansion when the flowing fluid is submitted to a high intensity acoustic radiation.

A first main application of the present invention is the drying of wet products, mainly industrial drying, wherein it permits the recovery of water vapor and its latent heat from air/vapor mixtures, using robust, cheap and compact equipment with low energy consumption, i.e., a blower and a thermodynamic separator, or a combined blower/separator, instead of delicate and expensive apparatus such as the known types of heat pumps.

A second main application of the present invention is the abatement of acid gases, such as sulphur dioxide and nitrogen oxides, from flue gases produced by combustion in boilers, furnaces and incinerators, through condensation of associated water vapor, using said robust, cheap and compact equipment; the energy consumption of which is small and more than offset by the recovery of the latent heat of condensation of the water vapor.

A third main application of the present invention is the extraction and upgrading of the latent heat of condensation of a vapor in a gas/vapor mixture, using said robust, cheap and compact equipment. Said application includes heating, ventilating and air conditioning processes and installations.

A fourth main application of the present invention is the extraction, for recovery or disposal or any other purpose, of valuable and/or polluting gases and vapors contained in process or waste gases, including used air rejected in the atmosphere by industrial production plants, by gasoline refilling stations for cars, and the like, and also including automobile exhaust gases.

Other applications of the invention will emerge from and be apparent to those skilled in the art from the detailed description which follows.

The background art in the technical field of the present invention is exemplified by U.S. Pat. 3,854,300 (which is fully incorporated herein by reference thereto) and by European Patent Application 0,162,509. U.S. Pat. 3,854,300 describes a method of reducing the high moisture contents of a stream of gases by expanding said stream to a lower pressure such as to effect cooling and resulting water vapor condensation; separating resulting water condensate from the gas stream; recompressing the cold stream with retained latent heat of vaporization thereby further heating said stream; and then discharging the resulting heated stream with the lowered moisture content to the atmosphere.

As discussed in U.S. Pat. 3,854,300, said moisture containing gas stream may be expanded in a turbine type expansion means providing power therefrom and such power is then utilized in the recompression of the gas stream. The method of U.S. Pat. 3,854,300 is a particular application of the Brayton cycle which may be used for heat pumping in drying systems, as described in the following reference: J. L'HERMITTE et P. CHEVALIER, "Cycle de Brayton et pompes a chaleur—Developpement d'un systeme de sechage", E.D.F. (Electricite de France) Bulletin de la Direction des Etudes et Recherches Serie A, No 1, 1981 pp. 17–20.

In the HERMITTE reference, paragraph 1, "Presentation du cycle de Brayton, describes the background art relating to the Brayton cycle used in industry, as illustrated by FIG. 1 and FIG. 2. Paragraph 2, "Applications possibles" discloses several categories of applications, as illustrated respectively by FIGS. 3 to 7. Paragraph 3, Recherche de 'application du cycle de Brayton au sechage des cereales" discloses a particular embodiment of a drying process using a Brayton cycle, in which the drying chamber is at atmospheric pressure and no heat exchanger is required functionally, although an additional heat exchanger with a very limited heat exchange surface may be used to improve the overall coefficient of performance (COP) of the process. The operational flowsheets of the processes are illustrated in FIGS. 8 to 10 of the document, and its practical performances are shown in FIGS. 11 to 13 of the reference. It is clear to one skilled in the art the performances are poor.

European Patent Application 0,162,509 discloses a drying process (and corresponding apparatus) which is substantially a particular application (with waste heat recovery) of the method described in U.S. Pat. 3,854,300. In the European Application, the expansion and most of the recompression of the stream of gases, take place in an aerodynamic separator having no moving parts. The separator is composed of a convergent-divergent subsonic nozzle in which inertial separation of the condensate takes place at or near the throat region of the nozzle. The driving energy required by this aerodynamic separator is supplied to the process by a blower which moves the main gaseous stream against all head losses throughout the complete circuit. Auxiliary means may be provided in the inlet plenum of the nozzle in order to initiate and enhance the condensation process. In a particular embodiment described in the European Patent Application, the expansion of the gaseous stream includes a steady component and an oscillatory component, the latter being obtained by the action, within the flowing fluid, of very intense sonic or ultrasonic waves. The effect of the oscillatory component of the expansion is, on one hand, to induce acoustic agglomeration of the droplets of condensate and on the other hand, to cause transient additional condensation by the particular mechanism described in lines 8 to 13, page 12 of the specification, this mechanism is called "acoustic condensation". The required acoustic energy is generated mechanically either by the flowing stream itself, or by appropriate transducers, or by the blower supplying the driving energy required by the process.

According to the above-referenced European Patent Application, the amount of the acoustic energy radiated by the sonic wave represents only a minor fraction of the driving energy required by the process, and the latter energy itself represents only a minor fraction of the mechanical energy produced by the expanding fluid in the convergent part of the nozzle.

The drying process (and corresponding apparatus) described in the above-referenced European Patent Application has thus the following inherent limitations:

(1) The maximum pressure ratio of the steady state component of the expansion in the aerodynamic separator cannot exceed an upper limit at which the velocity of sound is reached in the throat of the nozzle; for atmospheric air, this limit is about 1.6 and is not sufficient for enabling per se the self-initiation of condensation during the phase of expansion of the incoming stream;

(2) When expanding air nearly saturated with water vapor, at pressure ratios not exceeding the latter limit, auxiliary means are required to enable the condensation in the throat region to reach a level close to thermodynamic equilibrium;

(3) The temperature increase which can be achieved by the process between the outlet and the inlet of the air in the dryer chamber cannot exceed an upper limit of 25° to 30° C., and the condensate quantity which can be extracted by the process cannot exceed 10 to 12 gr $_{H20}$ per kg dry air when acoustic condensation is not used; and (4) Acoustic condensation may raise the quantity of condensate at the expense of the additional energy consumption required to provide adequate acoustic energy radiation.

Summarizing the state of the art, the known processes and apparatuses in the field of the invention (1) either have poor energetic efficiencies and COP's, and therefore they are not economically feasible in general; or (2) only have limited applications.

SUMMARY OF THE INVENTION:

It is an object of the present invention to provide an improved process and apparatus for extracting, in an open or closed circuit, a liquid from an aggregate, by evaporation in a stream of carrier gas, followed by separation of said evaporated liquid from said carrier gas, with an energetic efficiency high enough to enable the process to be economically feasible in a very broad field of applications, without using delicate, expensive and/or bulky apparatuses such as heat pumps.

It is another object of the present invention to provide an improved process and apparatus for thermodynamically separating, under liquid form, a vapor mixed with a carrier gas in a thermodynamic separator requiring functionally no heat exchanger and wherein the driving energy providing the separative work is essentially mechanical energy supplied to a rotor of the separator in order to provide compression work of the fluid mixture within said separator.

Other objects, advantages and features of this invention will become apparent to one skilled in the art upon consideration of the specification and drawings.

In the process and apparatus in accordance with the present invention, a carrier gas entering an open circuit, or running in a closed circuit, is used to extract a liquid substance from an aggregate, by evaporation of that substance in the carrier gas. The mixture of the vapor with the carrier gas is then driven through a thermodynamic separator wherein the driving energy supplying the separative work is provided by mechanical means causing a pressure increase of the gas/vapor mixture within the separator. The separator causes the main stream of carrier gas to lose a portion of the vapor substance it contained, while the stream diverted by the separator is substantially that vapor substance in liquid form. The separation comprises expanding the high moisture contents stream to a lower pressure so as to effect cooling and resulting liquid condensation, separating resulting liquid condensate from the gas stream, recompressing the cold stream with retained latent heat of vaporization thereby further heating said stream, and discharging the resulting heated stream with the lowered moisture content at a section of the circuit where it is recycled or where it is rejected to the atmosphere without or after substantial recovery of its heat. Both the expansion and compression are performed substantially adiabatically and at least partly in rotating machinery means wherein the expansion work is used to provide part of the compression work.

In a first embodiment of the present invention, at least part of the expansion and part of the compression take place, in one or several steps, in a wave pressure exchanger. Before each step of expansion in the exchanger, the liquid condensate is extracted by inertial diffusion through the main stream and separated by collecting means, and the main stream is then driven to the next step of the expansion; or after completion of the expansion and liquid condensate extraction, to the first step of the compression.

In a second and preferred embodiment of the present invention, the expansion and compression are not fully performed in the rotating machinery means, as the last part of the expansion and the first part of the compression are performed, as well as the extraction of the quantity of liquid condensate resulting from the expansion, in a convergent/divergent nozzle having collecting means for extracting the liquid condensate in or near the throat region of the nozzle. The gaseous stream leaving the nozzle is driven for recompression to the inlet of the rotating machinery means.

The present invention has several important features and advantages. For example, the exergetic efficiency of the process and apparatus following the first embodiment is appreciably better than that of the known process and apparatuses, although none of the limitation of some of these processes restrict the applications of the present invention. This fact is not at all obvious to one skilled in the art. To the contrary, it may seem obvious to a person skilled in the art that wave pressure exchange cannot work properly when applied to a gaseous stream in which a liquid phase is caused to appear, thereby causing considerable parasitic wave reflexion and corresponding energy losses. This subject is discussed hereinafter in the detailed description of the preferred embodiments of the present invention.

The energetic efficiency of the process and apparatus in accordance with the second embodiment of the present invention is still better (relative to the first embodiment).

BRIEF DESCRIPTION OF THE DRAWINGS:

Referring now to the drawings, wherein like elements are numbered alike in the several FIGURES.

Figure 1:
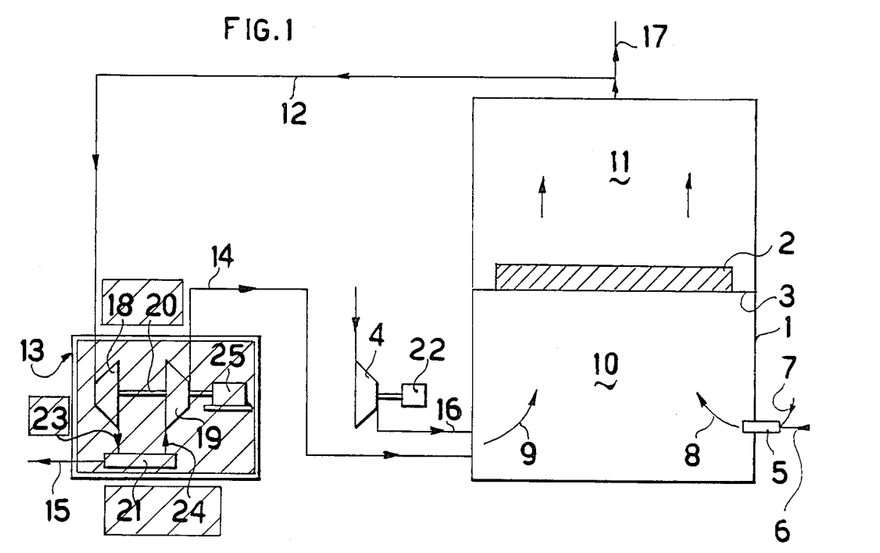
FIG. 1 is a schematic diagram of an application of the present invention to industrial drying in closed circuit, using the thermodynamic separator of FIG. 2.

DETAILED DESCRIPTION OF THE PREFERRED EMBODIMENT:

In the application illustrated by FIG. 1, drying takes place in an enclosure 1 in which an aggregate, for example wet germinated barley 2, stays on a tray 3. A blower 4 operates together with a burner 5 which is fed with combustion air 6 and fuel 7, producing combustion gases 8 which are mixed with drying air 9. Burner 5 is controlled so as to maintain in the lower portion 10 of enclosure 1 the drying air temperature at the required level.

The drying air then crosses wet barley layer 2 and leaves enclosure 1 through its upper portion 11 at a temperature which varies during the drying operation, but which is 40° to 50° C. lower than the temperature in lower portion 10. Most of the moist air is sucked from section 11 of enclosure 1 by the thermodynamic separator 13 through duct 12. The remaining moist air is rejected into the atmosphere at 17.

The thermodynamic separator 13 separates the incoming stream of moist air into an outgoing main stream 14 of hot air with reduced moisture content and an outgoing diverted stream 15, composed essentially of cold water which is then rejected for disposal. The main stream is driven through duct 14 up to location 9 where it runs again along the drying circuit. The blower 4 driven by motor 22 injects fresh air at location 9 through duct 16 in order to compensate for leaks, losses and rejections of air to the outside atmosphere.

In the preferred embodiment of the present invention shown in FIG. 2, the thermodynamic separator 13 performs its function as follows. The higher moisture stream coming in through duct 12 undergoes an adiabatic expansion in wave pressure exchanger 26 connected by shaft 20 to motor 25. This stream enters the exchanger through port 27 and leaves it through port 28, cooled and at low pressure, and containing liquid condensate, to enter the aerodynamic separator 29 at 23 (which is described below). The hot lower moisture stream leaving the aerodynamic separator 29 at 24 enters the wave pressure exchanger 26 through port 30 and leaves through port 31 after having been recompressed to the pressure level required to enable the hot stream to be reinjected through duct 14 at location 9. As the mechanical work supplied by the expanding stream in the wave pressure exchanger is smaller than the mechanical work absorbed by the compression of the stream in the rotating machine, the electric motor 25 provides the additional mechanical work required through shaft 20.

Aerodynamic separator 29 is of a type described in European Patent Application 0,162,509, which normally requires auxiliary means to initiate and enhance the condensation process in the nozzle; and to create acoustic radiation for performing acoustic agglomeration and acoustic condensation. As used herein, the auxiliary means are not required, because the stream entering the aerodynamic separator already contains droplets of liquid condensate and other condensation nuclei resulting from the partial expansion of the stream in wave pressure exchanger 26, and also contains very intense acoustic radiation which is a result of the wave pressure exchange process.

The aerodynamic separator 29 consists of a convergent/divergent nozzle without moving parts wherein said liquid is extracted, according to the following steps:

(a) accelerating adiabatically and quasi-isentropically the mixture of vapor and carrier gas through the convergent part of a convergent/divergent nozzle to form within the throat of the nozzle an expanded stream of high velocity fluid which contains droplets of liquid substance condensed from the gaseous mixture as a result of its expansion;

(b) withdrawing the droplets of condensate from the stream within the throat region of the nozzle by collecting means located along the axis and/or the wall of the nozzle at places which intersect the paths of the droplets; and (c) decelerating adiabatically and quasi-isentropically the high velocity stream of the mixture of carrier gas and remaining vapor in the divergent part of the nozzle.

When the system is operating under steady state conditions, the power input brought into the circuit by motors 25 and 22 exactly compensates the total heat losses. Of the circuit, including the loss by air intentionally rejected at 17 in order to enable said compensation.

Figure 3:
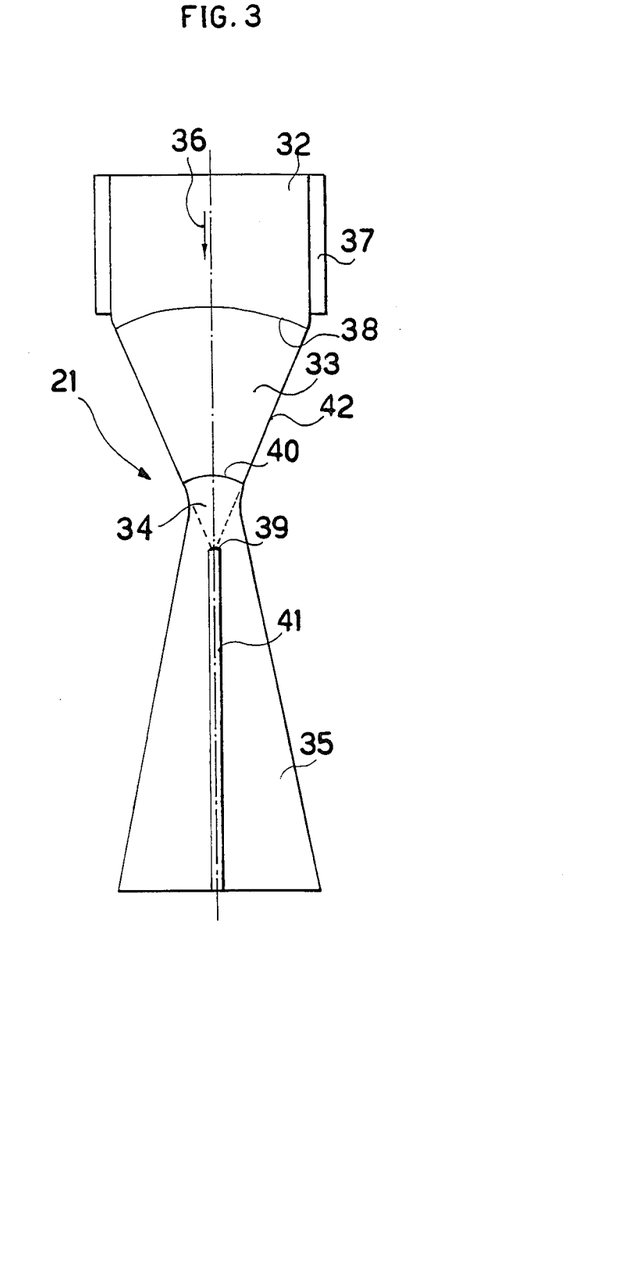
FIG. 3 is a more detailed schematic diagram of a convergent/divergent nozzle separator.

Separator 29 is shown in more detail in FIG. 3, where the separator enclosure 42 has the general shape of an axisymmetric nozzle comprising a cylindrical chamber 37, a convergent truncated cone 33, a throat 34 and a divergent section 35. As shown in FIG. 3, these elements are linked in such a way as 1 avoid angular points in the axial cross-section of the nozzle. The general direction of the moist air flowing into the nozzle is shown by arrow 36. The moist air entering chamber 32 may be submitted in this chamber to an acoustic radiation generated from an annular enclosure 37 by generators of sonic waves of a known type, so that at the inlet section of the air in the convergent part 33, the wave front has the shape of a spherical surface 38 of which the geometric center is located at a point 39 which is on the axis of the nozzle, downstream from the minimal section of its throat 34.

An adiabatic, quasi-isentropic expansion of the flowing fluid occurs in the convergent truncated cone 33. The steady component of this expansion results from the reduction of the cross-section of the fluid stream between the inlet of convergent part 33 and throat 34 of nozzle 42. The oscillatory component of this expansion results from the spherical acoustic wave of which the front progresses from 38 to 40.

All the streamlines within convergent part 33 have rectilinear paths which are perpendicular to the front of the spherical acoustic waves and which converge toward a focus located at point 39. Under the effect of the combined steady and oscillatory expansions of the fluid moving in the convergent part 33, part of the water vapor contained in the incoming stream of moist air condenses as droplets. As the density of these droplets is larger (by a factor on the order of one thousand), than the density of the moist air entering throat 34 of the nozzle, these droplets follow their rectilinear paths towards focus 39, and are only slightly deviated by the streamlines of the dehumidified air which they cross within throat 34 of the nozzle.

These droplets are then collected in a hollow cylindrical collector 41, having a small diameter, and located along the axis of the divergent part 35 of the nozzle; and of which the circular inlet cross-section is centered at point 39 or slightly behind this point along the direction of the flow. The air stream from which the droplets were thus swept away in the region of the throat of the nozzle enters the divergent part 35 where it undergoes an adiabatic, quasi-isentropic recompression transforming into enthalpy the kinetic energy it has in the throat of the nozzle.

An important factor in the energetic efficiency of wave pressure exchangers is impedance matching of the driver and driven gases. An impedance matched interface between two gases allows a sound or a shock wave to proceed from one gas into the other without any wave reflections at the interface. In terms of the gas conditions at the interface, this requirement means that the product of density and sound speed, as well as the specific heat ratio k, must be the same on each side of the interface. As these characteristics are very different for dry gas/vapor mixture (where only the gas phase is present) and a wet gas/vapor mixture (where both gas and liquid phases are present), respectively, it is important to prevent condensation while the wave pressure exchange proceeds. Such prevention is possible, due to the existence of a time lag between the sudden expansion of a gas/vapor mixture and the actual condensation. The time lag varies with factors which include the pressure ratio of the expansion. Therefore it is important to keep the pressure ratio of each expansion step in the wave pressure exchanger below the critical value above which condensation would occur at locations where it would cause parasitic wave reflections with corresponding energy losses.

In accordance with the present invention, each step of the expansion of the main stream in the wave pressure exchanger is followed by a separation of the liquid condensate resulting from the expansion step. Unless otherwise provided for specifically in this application, this separation may be performed in a curved duct by inertial diffusion of the droplets of condensate through the stream up to collecting means intersecting the paths of the droplets, the duct and the stream following a substantially helical path around the axis of the rotor of the wave pressure exchanger, the helical path having an angle equal or close to the angle of the stream at the outlet port of the exchanger.

Although the description of the process and apparatus of the present invention has been made for its particular application to industrial drying, the process using similar apparatus is applicable in any case where at least one constituent of any gaseous mixture can be extracted from the mixture through an adiabatic, quasi-isentropic expansion causing the constituent to be partially condensed, and then separated under condensed form.

The composition of the condensate thus obtained results from the composition of the gaseous mixture which is processed. For example, if the process of the present invention is applied to flue gases from industrial boilers burning coal, the condensate will not be pure water, but a solution in water of one or several constituents of the flue gases, such as $SO^2$, $NO$, $NO^2$, $CO^2$, etc. This particular feature easily enables separation, not only of condensable vapors, but also of gases which are difficult to condense, provided they are soluble in the condensate of easily condensable vapors. The vapors can thus have a sweeper or scavenger action.

In case the contents of said scavenging vapor into the carrier gas is insufficient to sweep out of the carrier gas specific gases to be separated, or if its scavenging capacity is insufficient, one may add to the mixture to be separated, before processing it, an additional constituent under gaseous and/or liquid and/or solid form (droplets or particles in suspension), which is able to act as a sweeper or scavenger of the specific gases. For example, sulphur dioxide, $SO^2$, can be absorbed by the condensate of water vapor. The sulphur dioxide can thus be integrally swept out, and recovered by processing the separated liquid by any known means.

Figure 2:
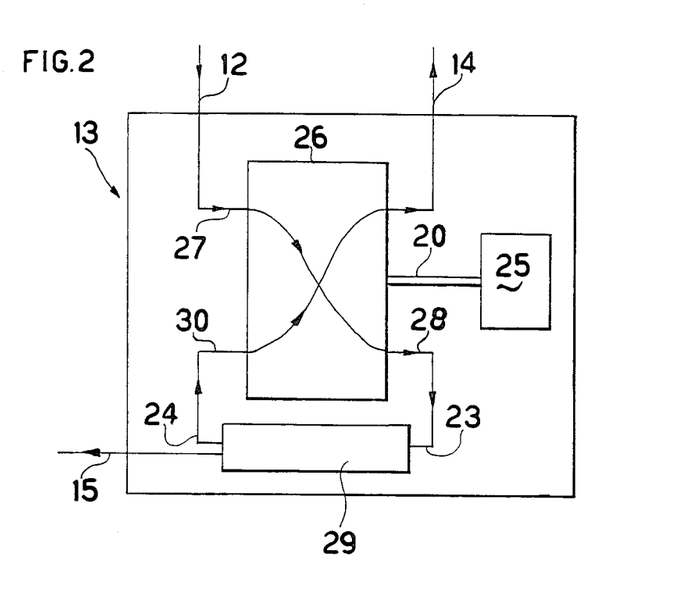
FIG. 2 is a schematic diagram for the application of FIG. 1, and shows a thermodynamic separator using a wave pressure exchanger with one step of compression and expansion.

The range of vapors and gases which can be extracted by the process and apparatus in accordance with the embodiment of the present invention shown in FIG. 2 is very wide, as the ratio between the initial pressure of the gaseous mixture to be processed and the minimal instantaneous pressure within the flowing mixture may be very high. Indeed, this ratio is the product of the pressure ratio of the steady component of the expansion; and the pressure ratio of the oscillatory component of the expansion. The greater the global pressure ratio thus obtained, the greater is the enthalpy drop after expansion, the greater is the corresponding temperature drop, and the more efficient is the separation achieved by condensation.

In fact, the present invention is operational without any restriction to the extraction of any liquid from an aggregate. The aggregate may be a mixture or a combination of different chemical or isotopic components in any proportions. The liquid to be extracted can be a simple substance or a mixture of a combination of different chemical or isotopic components in any proportion. The carrier gas can be composed of any constituents in any proportions.

It will be appreciated that the expressions convergent/divergent nozzle, convergent part, divergent part, throat, throat region, places which intersect the paths of the droplets and duct, as used in this specification and in the appended claims, must be understood in a broad sense which not only applies to Venturi-like nozzle separators, but also to other types of separators which may or may not be axisymmetrical, with or without a rectilinear or curved axis, wherein the cross section of the stream is progressively reduced to cause said stream to accelerate, then kept constant along some length, then progressively increased again to cause said stream to decelerate. For example, such a separator may consist of an enclosure having a cylindrical outer wall with a constant circular cross section and a rectilinear axis, a circular cross section at the inlet and outlet of the fluid stream, and within which an axisymmetrical body centered along the same axis causes for the fluid stream a change from circular to progressively reduced annular cross section, then a constant annular cross section for some length (throat and throat region) and then a progressively increasing annular cross section becoming again circular towards the outlet of the separator. Such a separator may have means causing the flow to follow helical paths only within the throat region. Paths of the droplets must also be understood as including the streamlines of liquid condensate flow resulting from the grouping of the droplets.

While preferred embodiments have been shown and described, various modifications and substitutions may be made thereto without departing from the spirit and scope of the invention. Accordingly, it is to be understood that the present invention has been described by way of illustrations and not limitations.

What is claimed is:

1. A process for at least partially extracting a liquid from an aggregate by evaporation of the liquid and dispersing the resultant vapors in a stream of carrier gas in an open or closed circuit and for separating at least a portion of said vapors from said stream of carrier gas, said separation comprising:
   (a) at least partly in a rotary wave pressure exchanger, by at least one step of wave pressure exchange including furnishing energy to a compression step described in (c) below, expanding carrier gas containing such vapors to a lower pressure for cooling the gas and thus condensing at least a portion of such vapors;
   (b) separating resulting liquid condensate from the gas;
   (c) returning gas recovered from (b) with retained latent heat of vaporization to said wave pressure exchanger and compressing the returned gas by at least on step of wave pressure exchange including receipt of energy from the foregoing expansion of the gas in (a) above, and thus heating the gas;
   (d) both said expansion and said compression steps being performed substantially adiabatically.

2. A process according to claim 1 wherein acoustic energy is applied in the separator for agglomerating droplets of condensate.

3. A process according to claim 1 wherein acoustic energy originating from the wave pressure exchanger as a result of the wave pressure exchange process is transmitted into the separator for agglomerating droplets of condensate.

4. A process according to claim 1 wherein acoustic energy is applied in the separator for assisting in condensing vapor.

5. A process according to claim 1 wherein acoustic energy originating from the wave pressure exchanger as a result of the wave pressure exchange process is applied in the separator for assisting in condensing vapor.

6. A process according to claim 1 including condensing of vapors after but as a result of said wave pressure exchange step.

7. A process according to claim 1 wherein expanded gas from the wave pressure exchanger, introduced into the separator, contains condensation nuclei resulting from expansion of the gas in the wave pressure exchanger.

8. A process according to claim 1 wherein step (a) is concluded and step (b) is begun by passing the gas through a nozzle type separator wherein condensate is extracted, including:
   (a) adiabatically and substantially isentropically accelerating vapor and carrier gas through the convergent part of a convergent/divergent nozzle having a throat region, to form within the throat region an expanded stream of high velocity fluid which contains droplets of liquid condensed as a result of expansion,
   (b) withdrawing droplets of condensate from the stream within the throat region, and
   (c) adiabatically and substantially isentropically decelerating the stream of carrier gas and remaining vapor in the divergent part of the nozzle.

9. A process according to claim 8 wherein intense acoustic energy originating from the wave pressure exchanger as a result of the wave pressure exchange process is transmitted into the nozzle type separator for agglomerating droplets of condensate by acoustic radiation.

10. A process according to claim 8 wherein intense acoustic energy originating from the wave pressure exchanger as a result of the wave pressure exchange process is transmitted into the nozzle type separator for assisting in condensing vapor.

11. A process according to claim 8 wherein expanded gas from the wave pressure exchanger, introduced into the nozzle type separator, contains condensation nuclei resulting from expansion of the gas in the wave pressure exchanger.

12. The process of claim 1 wherein separation of condensate from the gas is performed at least in part by inertial diffusion of droplets of condensate into collecting means intersecting paths followed by said droplets.

13. The process of claim 1 wherein separation of condensate from the gas is performed at least in part by discharging gas from an outlet port of the wave pressure exchanger into a separator with a curved duct defining a substantially helical path around the axis of the rotor of the wave pressure exchanger, said helical path being at an angle equal or close to the angle of said stream at the outlet port, and causing the gas to flow through said duct.

14. The process of claim 1 in which the pressure ratio of the gas during expansion in the wave pressure exchanger is kept below that critical level above which condensation would occur and cause parasitic wave reflections in the wave pressure exchanger with corresponding energy losses.

15. The process of claim 1 wherein said gas is expanded in said wave pressure exchanger in a plurality of stages including production of liquid condensate, and in which expansion of gas in a given stage is preceded by separation of the liquid condensate resulting from a previous stage of expansion.

16. Apparatus for at least partially extracting a liquid from an aggregate by evaporation of the liquid and dispersing the resultant vapors in a stream of carrier gas in an open or closed circuit and for separating at least a portion of said vapors from said stream of carrier gas, said apparatus comprising:

(a) a rotary wave pressure exchanger with expansion means for substantially adiabatically expanding carrier gas to a lower pressure by wave pressure exchange, with cooling of the gas and condensing of at least a portion of such vapors, and for furnishing energy to compression means described below;

(b) separating means for receiving cooled gas and resulting liquid condensate and for separating such condensate from the cooled gas;

(c) compression means in said wave pressure exchanger for receiving gas recovered from the separating means with retained latent heat of vaporization and for substantially adiabatically compressing the recovered gas by wave pressure exchange with heating of the gas, and for receiving energy from the expansion means described above.

17. Apparatus according to claim 16 wherein the separator means includes means for applying acoustic energy to the cooled gas and condensate for agglomerating condensate.

18. Apparatus according to claim 16 including means for transmitting acoustic energy from the wave pressure exchanger into the separator for agglomerating condensate.

19. Apparatus according to claim 16 wherein the separator means includes acoustic condensation means for applying acoustic energy to the expanding stream of high velocity fluid for assisting in condensing vapor.

20. Apparatus according to claim 16 including means for transmitting acoustic energy from the wave pressure exchanger into the separator, and means in the separator for applying said acoustic energy to the expanding stream of high velocity fluid for assisting in condensing vapor.

21. Apparatus according to claim 16 including means for transmitting from the wave pressure exchanger into the separator, expanded gas containing condensation nuclei resulting from expansion of the gas in the wave pressure exchanger.

22. Apparatus according to claim 16 wherein the separator means is a nozzle type separator which comprises:

(a) a convergent/divergent nozzle having a throat region, for forming within said throat region an adiabatically and quasi-isentropically expanded stream of high velocity fluid which contains carrier gas and droplets of liquid condensed as a result of expansion, (b) means for withdrawing droplets of condensate from the stream within the throat region, and (c) means for adiabatically and substantially isentropically decelerating the stream of carrier gas and remaining vapor in the divergent part of the nozzle.

23. Apparatus according to claim 22 wherein the nozzle type separator means includes acoustic condensation means for applying intense acoustic energy to the expanding stream of high velocity fluid for assisting in condensing vapor.

24. Apparatus according to claim 22 including means for transmitting acoustic energy from the wave pressure exchanger into the nozzle type separator for condensing vapor by acoustic radiation.

25. Apparatus according to claim 16 wherein the separation means includes means for inertial diffusion of droplets of condensate into collecting means intersecting paths followed by said droplets.

26. Apparatus according to claim 16 wherein the separation means includes a separator with a curved duct connected with an outlet port of the wave pressure exchanger to receive an expanded stream of fluid therefrom, said duct forming a substantially helical path around the axis of the rotor of the wave pressure exchanger, said helical path being at an angle equal or close to the angle of said stream at the outlet port.

27. Apparatus according to claim 16 wherein the wave pressure exchanger includes (a) a rotor, a first inlet port for an incoming first stream of carrier gas and vapor for expansion, a first outlet port for discharging said first stream after its expansion in said exchanger, a second inlet port for an incoming second stream for compression, and a second outlet port for discharging said second stream after its compression in said exchanger, (b) first duct means for conveying the expanded first stream from said first outlet port to a liquid condensate separator, (c) said separator having an inlet section for receiving said expanded first stream, a first outlet section for discharging condensed liquid from the separator, and a second outlet section for discharging gas of reduced vapor content from the separator, and (d) second duct means for conveying gas from said second outlet section to the second inlet port of said pressure exchanger.

* * * * *

UNITED STATES PATENT AND TRADEMARK OFFICE
CERTIFICATE OF CORRECTION

PATENT NO. : 4,860,547
DATED : August 29, 1989
INVENTOR(S) : Pierre E. Maldague It is certified that error appears in the above-identified patent and that said Letters Patent is hereby corrected as shown below:

Column 1, line 42, delete "or" between "coal" and "burning";

Column 2, line 53, after "...du cycle de Brayton" insert quotation marks so that the phrase reads --du cycle de Brayton",--;

Column 2, line 58, insert quotation marks before "Recherche..." so that it appears --"Recherche...--;

Column 3, line 60, correct "10 to 12 gr $_H2O$" to read --10 to 12 gr $H_2O$--;

Column 6, line 56, change "losses. Of the circuit," to read --losses of the circuit,--;

Column 6, line 63, change "in such a way as 1 avoid" to read --in such a way as to avoid--;

Signed and Sealed this

Third Day of November, 1992

Attest:

DOUGLAS B. COMER

*Attesting Officer*     *Acting Commissioner of Patents and Trademarks*